United States Patent Office 3,501,810
Patented Mar. 24, 1970

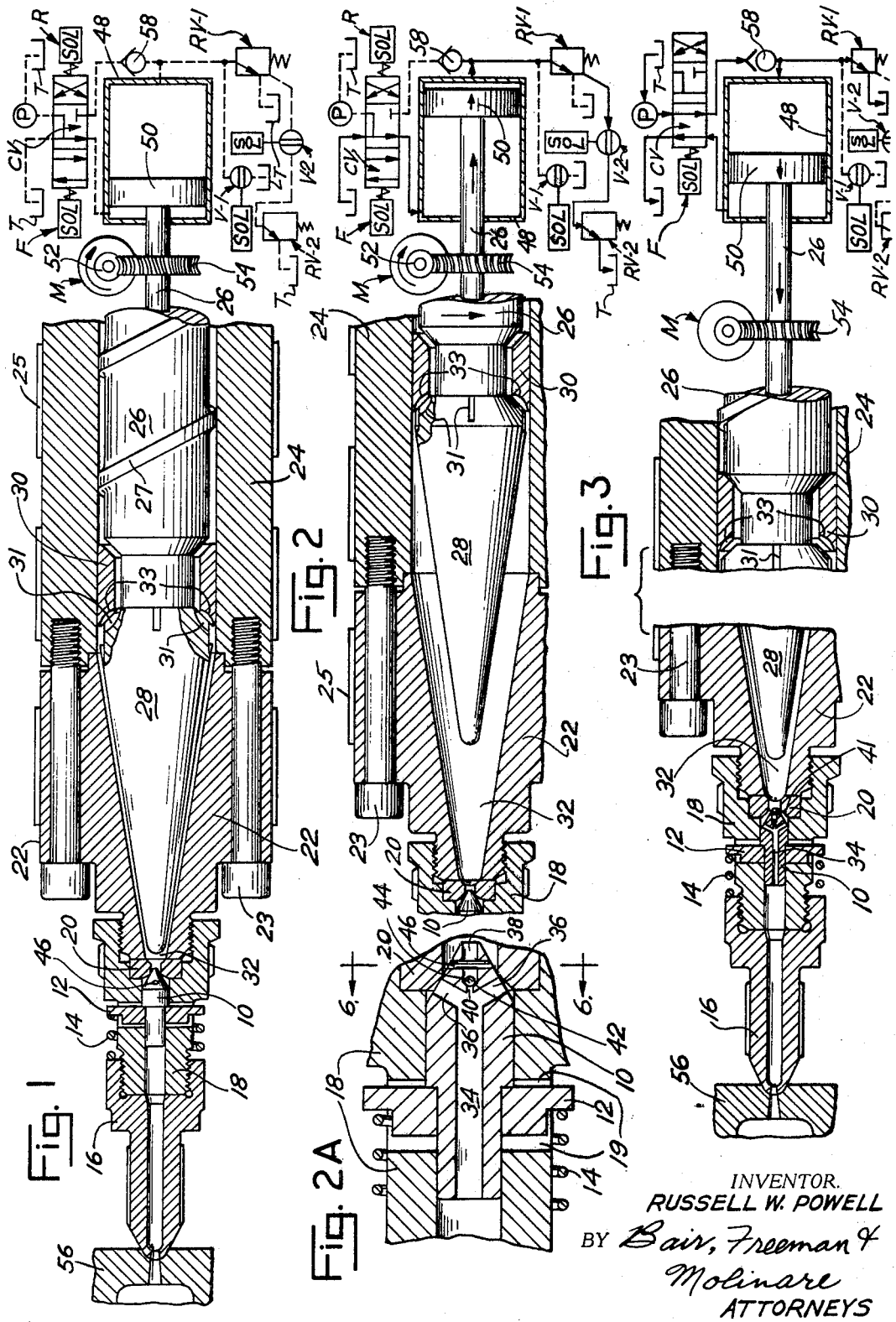

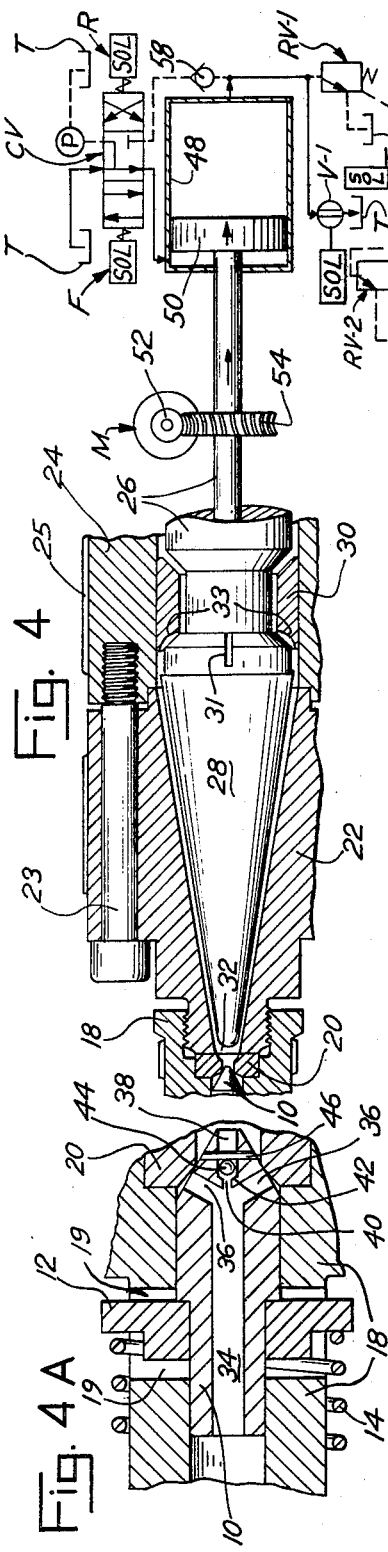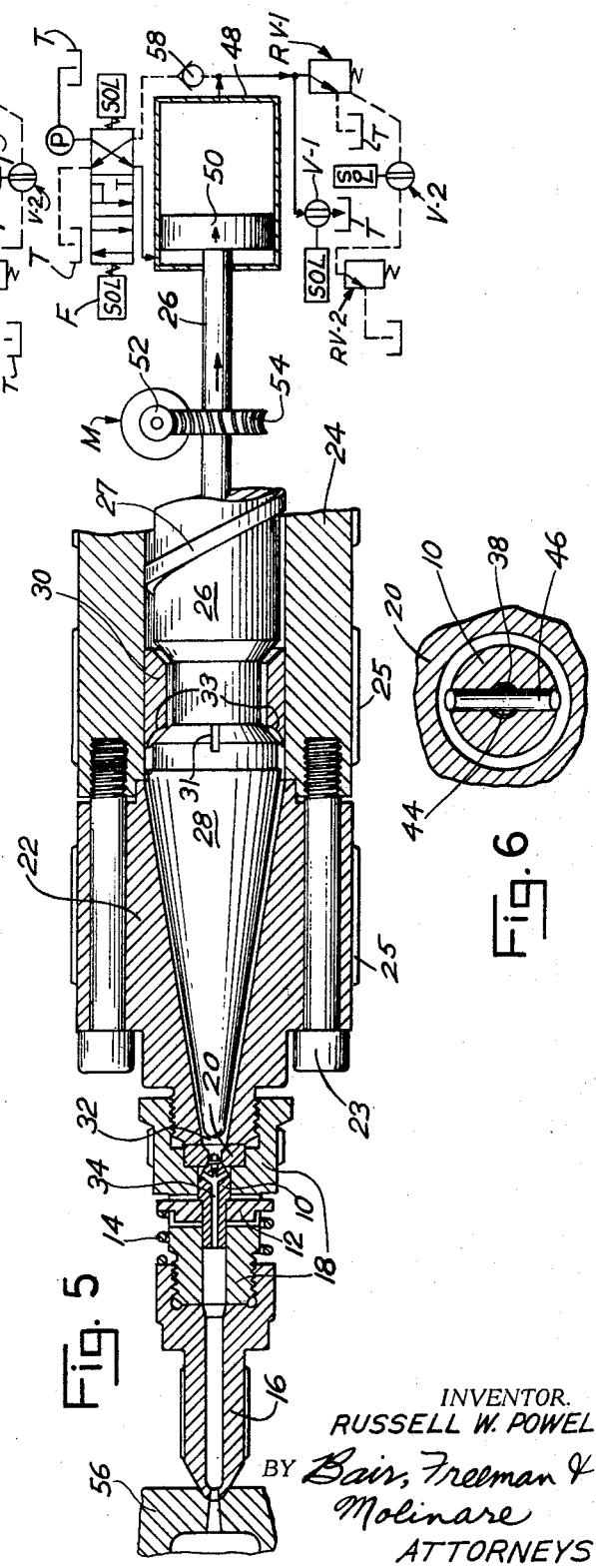

3,501,810
PRESSURE RELEASE CHECK VALVE FOR PRESSURE OPERATED INJECTION NOZZLE
Russell W. Powell, Richmond, Ind., assignor to National Automatic Tool Company, Inc., a corporation of Indiana
Filed Apr. 17, 1967, Ser. No. 631,419
Int. Cl. B29f 1/03
U.S. Cl. 18—30                                    9 Claims

ABSTRACT OF THE DISCLOSURE

A pressure release check valve is associated with a pressure operated injection nozzle in such manner as to release pressure from a mold after the mold has been charged through the pressure operated injection nozzle. The pressure release check valve is thus opened by back pressure from the mold as the molding material therein expands to atmospheric pressure following its subjection to injection pressure and upon such injection pressure being released following the completion of the molding operation.

---

Pressure operated shut-off plungers have heretofore been used in injection molding machines as disclosed in Beck et al. Patent No. 2,940,132 and French Patent No. 912,194.

One object of the present invention is to provide a specially designed pressure release check valve contained with a pressure operated shut-off plunger of an injection nozzle, which shut-off plunger, during an injection operation, is opened by the pressure of the injected material to permit passage of such material to the nozzle and into the mold.

Another object is to provide in combination with a pressure operated shut-off plunger of the injection nozzle which is opened by injection pressure during an injection operation, a reversely opening pressure release check valve located within the plunger to release pressure from the mold following the completion of an injection operation.

Still another object is to provide for automatic operation of the pressure release check valve upon recession of the injection pressure so that the material which has been injected will not drool from the mold when the injection nozzle is retracted from contact therewith, as any drooling material will chill and ruin the next molded part. My type of pressure release check valve accordingly eliminates such drooling and the consequent defect of the following molded part and of course the necessity of discarding such part.

A further object is to provide a pressure release check valve which may be built directly into the pressure operated shut-off plunger of the injection nozzle without undue complication and without any sacrifice of the effectiveness thereof.

Still a further object is to provide for positive creation of a vacuum for acting on the pressure release check valve is required for some types of molded articles and/or plastic materials.

With these and other objects in view, my invention consists in the construction, arrangement and combination of the various parts of my pressure release check valve for pressure operated injection nozzles, whereby the objects above contemplated are attained, as hereinafter more fully set forth, pointed out in my claims and illustrated in detail on the accompanying drawings, wherein:

FIG. 1 is a longitudinal sectional view through an injection cylinder or barrel, a pressure operated injection nozzle and the adjacent portion of a mold, and includes a hydraulic and motor drive diagram, the parts being in the position they assume at the beginning of a filling operation of the injection cylinder.

FIG. 2 is a similar sectional and diagrammatic view showing a screw and screw tip being retracted with respect to the injection nozzle as the barrel of the machine is being charged with plastic material to be injected.

FIG. 2A is an enlargement of the pressure operated injection nozzle and my pressure release check valve with the parts in the positions assumed as a result of the operation depicted in FIG. 2.

FIG. 3 is a sectional and diagrammatic view similar to FIG. 1 showing the injection operation in process.

FIG. 4 is a similar sectional and diagrammatic view showing the parts in the positions they assume after the injection operation has been completed and while pressure is being released from the mold.

FIG. 4A is an enlargement of the pressure operated injection nozzle and my pressure release check valve with the parts in positions assumed by the operation depicted in FIG. 4.

FIG. 5 is a sectional and diagrammatic view similar to FIG. 4 but showing a modified type of operation which produces a vacuum action on my pressure release check valve, and FIG. 6 is a sectional view on the line 6—6 of FIG. 2A to show details of construction.

On the accompanying drawings I have used the reference numeral 10 to indicate a pressure operated shut-off plunger. The plunger 10 is shouldered down and pressfitted into a cross head 12 as shown in FIG. 2A and a spring 14 is interposed between the cross head and a nozzle tip 16 as shown in FIG. 1. The nozzle tip 16 is adapted for coaction with the sprue opening of a mold 56 as also shown in FIG. 1 during a molding operation as well known in the prior art. Accordingly, the spring tends to keep the pressure operated nozzle body 18 screwed onto an end cap 22 of a screw cylinder or barrel 24. The end cap 22 is held in position on the cylinder 24 by screws 23 and the pressure operated nozzle body 18 is provided with a cross slot 19 for the cross head 12, as shown in FIGS. 2A and 4A.

Within the screw cylinder 24 is an extrusion screw 26 having a screw tip 28. The screw 26 as shown diagrammatically in FIGS. 1, 2, 3, 4 and 5 is adapted for both motor operation and hydraulic cylinder-and-piston operation, the motor being shown at M, the cylinder at 48 and the piston at 50. The motor drives a worm 52 meshing with a worm gear 54 for rotating the screw 26 and its screw tip 28 while the piston 50 is operatively connected with the screw 26 to hydraulically move the screw forwardly as in FIG. 3 or rearwardly as in FIG. 5. A thread 27 on the screw coacts with the inner surface of the cylinder 24 to produce a charge of heated molding material in a chamber 32 of the end cap 22, electric heaters 25 being indicated for the end cap and the cylinder 24.

At 30 I show a back flow valve in the form of a check ring which, as shown in FIG. 1, permits flow of the heated plastic material from the right toward the left through passageways 31 in the screw tip 28, and 33 in the check ring 30, but in the closed position of FIG. 3 prevents flow in the opposite direction so that as the screw 26 and the tip 28 are moved toward the left they will cooperate with the check ring 30 and act as an injection plunger for charging the mold 56. The screw tip 28 cooperates with the chamber 32 in the end cap 22 to displace the heated plastic material through the orifice plate 20 and into the nozzle tip 16 as will hereinafter appear.

Describing now my pressure release check valve as applied to the foregoing described injection molding machine, I provide the pressure operated shut-off plunger 10 with a main passageway 34 communicating with one or more ports 36. A pressure release passageway 38 extends from the main passageway 34 to the tip of the shut-off plunger and has therein a restriction 40 forming a valve seat 42. A check valve in the form of a ball is shown at 44 normally seated by pressure against the seat 42 and held against dislocation when in the position of FIG. 4A by a retainer pin 46.

The cylinder 48 and the piston 50 are part of a hydraulic system wherein T indicates a tank or hydraulic fluid reservoir, F and R are forward and reverse solenoids of a control valve CV, P is a pump for hydraulic fluid, RV–1 is an injection pressure relief valve, RV–2 is a back pressure relief valve for extrusion and V–1 and V–2 are solenoid-operated valves. A check valve is illustrated at 58 in the circuit. .

PRACTICAL OPERATION

Heated plastic material is conveyed along the cylinder 24 by the thread 27 of the screw 26 when the motor M is energized and thereby causes rotation of the worm 52 and the worm gear 54 as in FIGS. 1 and 2. FIG. 1 illustrates the beginning of the filling operation with the screw tip 28 adjacent the shut-off plunger 10, a position of the parts assumed by a previous injection operation. FIG. 2 shows the cylinder filled with a charge of material inasmuch as the material is delivered to the cylinder 24 at a position (not shown) along the screw 26, and the thread 27 due to rotation of the screw forces the material toward the left into the chamber 32. This material displaces the screw toward the right as in FIG. 2 and the resulting extrusion pressure exerted on the material may be controlled by the setting of the relief valve RV–2 which is opened by back pressure from the cylinder 48 during the extrusion operation, the valve V–2 being open at this time by operation of its solenoid. The hydraulic diagrams show solid lines for operating portions thereof and dotted lines for non-operating portions thereof during the portions of the operating cycles illustrated in the respective figures of the drawings. The extrusion pressure above referred to is somewhat less than that required for the plastic material to force the shut-off plunger 10 open against the action of the spring 14. At the normal pressures generated by the rotation of the screw 26, the shut-off plunger 10 remains seated as in FIGS. 2 and 2A. When the proper amount of plastic material has been forced into the chamber 32, automatic means (not shown but which is well known in the prior art) stops operation of the motor M, and the molding machine is ready for the injection operation.

The injection operation is accomplished by shifting the control valve CV from the position of FIG. 2 to the position of FIG. 3 so that fluid pressure from the pump opens the check valve 58 and flows through it to the right hand end of the cylinder 48, thus displacing the piston 50 and moving the screw 26 and its tip 28 toward the left. The screw, the tip, and the check ring 30 act as a plunger to pressurize the molding material and force the shutoff plunger off the seat 41 as illustrated so that the molding material may flow through the ports 36 and the main passageway 34, and then through the nozzle tip 16 and into the mold 56. Sufficient pressure is generated on the plastic to cause the shut-off plunger to unseat permitting the flow of plastic on through the nozzle and out into the mold. This pressure is controlled by the setting of the relief valve RV–1 which is considerably higher than the setting of the relief valve RV–2. FIG. 3 shows the valve RV–1 relieving the excess pressure above that required in the cylinder 48.

After the injection hydraulic piston 50 has taken its stroke, pressure is released by return of the control valve CV from the position of FIG. 3 to the position of FIGS. 1 and 2 which position is also shown in FIG. 4. In FIG. 4, the valve V–1 is opened by operation of its solenoid so that the pressure within the cylinder 48 to the right of the piston 50 is relieved by fluid return to the tank. Accordingly the plastic material within the mold tends to expand to near atmospheric pressure since the injection pressure has been removed, pressure being released to a degree which permits the shut-off plunger to reseat, again sealing against the flow of plastic material and ready for the next injection cycle.

As soon as the pressure to the right of the shut-off plunger drops low enough, the ball 44 is lifted from its seat by the expanding plastic material in the mold and in the now seated plunger 10, thereby permitting any residual pressure to bleed out from the nozzle 16 through the passageways 34, 40 and 38. As in FIG. 4, the valve V–1 is open at this time, thereby permitting the screw 26 to be displaced toward the right and likewise the piston 50 in the cylinder 48 sufficiently to accommodate the plastic material issuing from the pressure relief passageway 38 as the hydraulic fluid cannot return to the tank past the closed check valve 58.

The pressure in the chamber 32 may be reduced in some instances by the mere opening of the valve V–1 as shown in FIG. 4, or in other instances by applying a definite force to cause the screw to be pulled to the right and thereby attempt to create a vacuum cavity in the chamber 32. FIG. 5 illustrates the latter possibility wherein the control valve CV has been actuated to the reverse position in addition to the valve V–1 being opened so that fluid pressure from the pump P is fed into the cylinder 48 to the left of the piston 50 for displacing it toward the right in a positive manner.

Tests which I have conducted on various molds and with various thermoplastic materials have indicated that the arrangement disclosed functions satisfactorily with some molds and materials requiring the type of pressure release accomplished by the mechanism as disclosed in FIG. 4 while others require the type disclosed in FIG. 5. If the pressure is not released, the plastic material will drool from the mold 56 prior to molding the next article therein. The drooled material will then chill and ruin such next article when it is molded. On still other molds and materials, especially in small sizes, my pressure release check valve arrangement is not required.

Some changes may be made in the construction and arrangement of the parts of my pressure release check valve as herein disclosed without departing from the real spirit and purpose of my invention, and it is my intention to cover by my claims and modified forms of structure or use of mechanical equivalents which may reasonably be included within their scope.

I claim as my invention:

1. In a pressure release check valve of the character disclosed, the combination with an injection nozzle of the pressure-operated type, a mold, said nozzle being opened by the pressure of the injected material to permit flow thereof through the said injection nozzle to said mold upon the injection material attaining injection pressure, a shut-off plunger carried by said nozzle, means to release pressure from within said mold upon the completion of the injection operation comprising check valve means which closes toward the mold during the injection operation and which opens to permit reverse flow of the injected material from the mold upon release of injection pressure, said check valve means including passageway extending from the discharge end to the upstream end of said shut-off plunger, cooperating valve elements in said passageway, said valve elements being engageable under injection pressure and being disengaged by expansion of the injection material upon release of injection pressure.

2. A pressure release check valve according to claim 1 wherein hydraulic means is provided to effect attainment of injection pressure, and such release of injection pressure is accomplished by providing a normally closed fluid return valve between said hydraulic means and a hydraulic fluid reservoir, and means is provided to open said fluid return valve at the completion of each molding operation.

3. A pressure release check valve according to claim 1 wherein hydraulic means is provided to effect attainment of injection pressure, and such release of injection pressure is accomplished by providing a control valve which in one position is operable to drive said hydraulic means in the injection direction and in another position to drive said hydraulic means in the reverse direction, and means is provided to move said control valve to said one position to accomplish the injection portion of a cycle of operation and to move it to said another position to accomplish the pressure release portion of a cycle of operation.

4. A pressure release check valve according to claim 1 wherein a hydraulic cylinder and a piston therein are provided to effect attainment of injection pressure, and such release of injection pressure is accomplished by providing a normally closed fluid return valve between the reverse end of said cylinder and a hydraulic fluid reservoir, and means is provided to open said fluid return valve at the completion of a molding operation.

5. A pressure release check valve according to claim 1 wherein hydraulic cylinder and a piston therein are provided to effect attainment of injection pressure, and such release of injection pressure is accomplished by providing a control valve for said cylinder operable in one position to drive said piston in the injection direction and in another position to drive said piston in the reverse direction, and means is provided to move said control valve to said one position to accomplish the injection portion of a cycle of operation and to move it to said another position to accomplish the pressure release portion of a cycle of operation.

6. A pressure release check valve according to claim 2 wherein a high-pressure relief valve and a low pressure relief valve are connected in tandem between the return port of said hydraulic means and said hydraulic fluid reservoir, and a valve is provided between said relief valves which is opened during injection cylinder filling operations and closed during injection and pressure release operations.

7. A pressure release check valve according to claim 3 wherein a high-pressure relief valve and a low pressure relief valve are connected in tandem between the return port of said hydraulic means and said hydraulic fluid reservoir, and a valve is provided between said relief valves which is opened during injection cylinder filling operations and closed during injection and pressure release operations.

8. A pressure release check valve according to claim 4 wherein a high-pressure relief valve and a low pressure relief valve are connected in tandem between the return port of said hydraulic means and said hydraulic fluid reservoir, and a valve is provided between said relief valves which is opened during injection cylinder filling operations and closed during injection and pressure release operations.

9. A pressure release check valve according to claim 5 wherein a high-pressure relief valve and a low pressure relief valve are connected in tandem between the return port of said hydraulic means and said hydraulic fluid reservoir, and a valve is provided between said relief valves which is opened during injection cylinder filling operations and closed during injection and pressure release operations.

References Cited
UNITED STATES PATENTS
| | | | |
|---|---|---|---|
| 2,892,214 | 6/1959 | McCarthy | 18—30 |
| 3,335,457 | 8/1967 | Martin | 18—30 |

FOREIGN PATENTS
| | | |
|---|---|---|
| 547,969 | 6/1956 | Belgium. |

J. HOWARD FLINT, JR., Primary Examiner

MICHAEL O. SUTTON, Assistant Examiner